United States Patent [19]
Wilcher

[11] Patent Number: 6,086,757
[45] Date of Patent: Jul. 11, 2000

[54] GUIDE ROLLERS FOR COG RAKE BAR SCREENS

[75] Inventor: Stephen B. Wilcher, Harleysville, Pa.

[73] Assignee: United States Filter Corporation, Lowell, Mass.

[21] Appl. No.: 09/122,321

[22] Filed: Jul. 24, 1998

Related U.S. Application Data

[63] Continuation-in-part of application No. 08/786,058, Jan. 21, 1997, abandoned.

[51] Int. Cl.[7] .................................................. B01D 29/64
[52] U.S. Cl. ........................... 210/159; 74/89.17; 74/422; 74/DIG. 10; 210/162; 210/232; 210/413; 254/95
[58] Field of Search ..................... 74/89.17, 422, 74/DIG. 10; 210/158, 159, 161, 162, 232, 413; 254/95

[56] References Cited

U.S. PATENT DOCUMENTS

| | | | |
|---|---|---|---|
| 3,591,006 | 7/1971 | Daferner | 210/159 |
| 3,825,125 | 7/1974 | Peterson et al. | 210/401 |
| 3,976,573 | 8/1976 | Miller | 210/158 |
| 4,620,927 | 11/1986 | Casper et al. | 210/236 |
| 4,645,598 | 2/1987 | Hannum | 210/232 |
| 4,780,199 | 10/1988 | Ezzell et al. | 210/159 |
| 5,246,573 | 9/1993 | Lodholz et al. | 210/159 |
| 5,887,982 | 3/1999 | Wilcher | 384/97 |
| 5,918,730 | 7/1999 | Wilcher | 198/733 |

OTHER PUBLICATIONS

DuPont, ZYTEL Nylon Resin Performance Properties, p. 15.
McGill, CCF–SB Series CAMROL Bearings, 2 pgs.
Link–Belt/FMC, Series B22400 and B22500, 3 pgs.
Osborn, Bearing Assemblies, Custom Designs, Flanged Rollers–Stud Style, 3 pgs.
Polymer Corporation, Nylatron GSM Blue Nylon Maching Stock Brochure, 10 pgs., Jan. 1995.

*Primary Examiner*—Peter A. Hruskoci
*Attorney, Agent, or Firm*—Michael Best & Friedrich LLP

[57] ABSTRACT

There is provided a guide roller assembly for use in a wastewater treatment facility comprising a pin and a guide roller, wherein the guide roller directly surrounds the pin and the pin rotates within the roller. There is also provided a guide roller assembly for use in a cog rake bar screen comprising a pin and a guide roller, the guide roller surrounding the pin, wherein the guide roller comprises a low-friction polymeric material and the pin rotates within the guide roller, the guide roller being free to rotate.

17 Claims, 3 Drawing Sheets

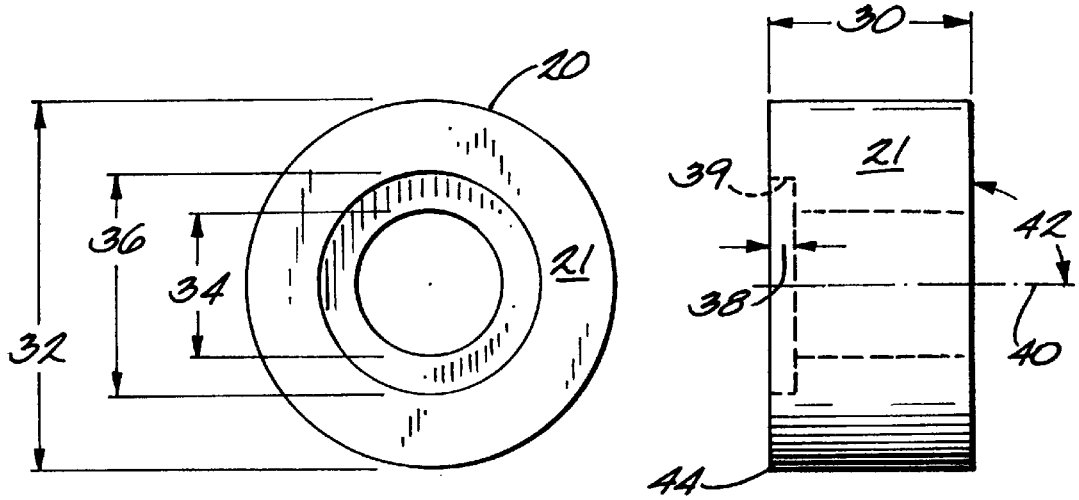
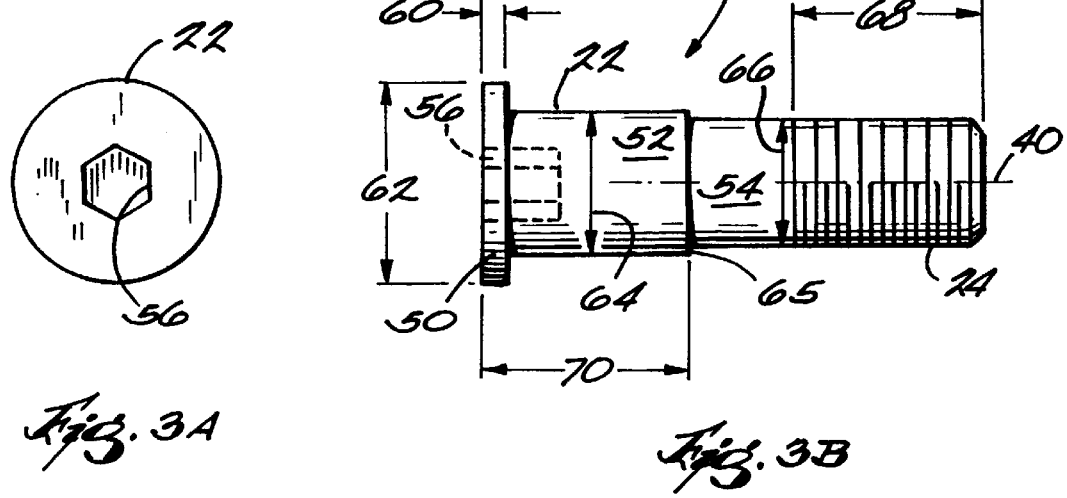

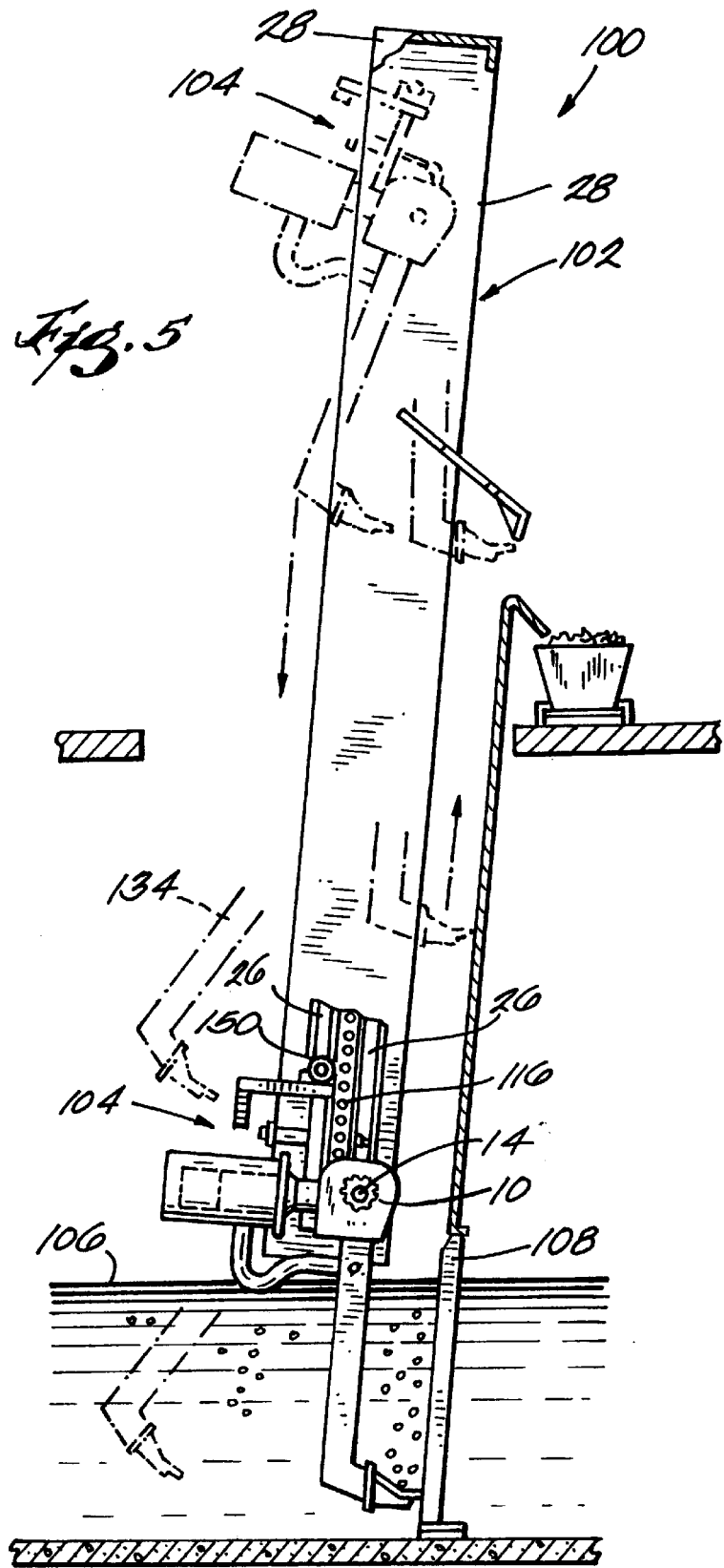

GUIDE ROLLERS FOR COG RAKE BAR SCREENS

This application is a continuation-in-part application of U.S. Ser. No. 08/786,058, filed on Jan. 21, 1997 now abandoned.

BACKGROUND OF THE INVENTION

1. Field of the Invention

This invention relates to cog rake bar screens and more particularly to guide rollers used with guide tracking on cog rake bar screens.

2. Description of Related Art

Cog rake bar screens are typically used in municipal and industrial coarse screening applications. The primary purpose of these screens is to retain and remove debris from channeled water flowing into water treatment plants, industrial sites, drainage facilities or overflow control facilities. Usually operated on float controls or timers these screens periodically remove debris which has accumulated on the upstream side of a bar rack mounted in the waste stream.

The mechanical cog rakes are guided by a guide track and may, for example, move in a counterclockwise path. Specifically, the mechanical cog rake may be lowered along the path and then move upward to remove the debris which has accumulated on the bar screen. After being raised, the cog rake may dump the debris into a trough.

The cog rake machines may utilize involute gearing and pin racks. As a result, they may require weldments internal to the side frames for the roller bearing guide tracking. During manufacturing, all guide tracking is generally shop fit and accurately welded into place inside the main side frame. If the frames are not accurately manufactured, the cog rake drive carriage operating within the guide may run very rough, vibrate significantly, or worse, potentially jam. If these machines do not run smoothly, then the excess vibration cannot only cause high stress loading on the subassemblies of the main rake carriage which operates within the guides, but can also lead to problems with the engagement of the drive carriage mounted rake teeth as they enter into the bar rack. Excess vibration may also cause the mounted rake teeth carriage to loose the debris the unit is attempting to remove.

Typically, standard spherical roller or ball bearing load runners which are packed with grease prior to installation along with spring loaded grease lubricators are used to help ensure that the guide rollers rotate freely thereby allowing the cog rake to smoothly move along the desired path. However, many applications may require that the cog rake mechanism itself be submerged into the wastewater being treated. The flow of the water or sewage may flush the grease from the bearings and may lead to the corrosion of the bearings. As a result, the bearings may lock up or otherwise fail to perform properly. It is therefore desirable to have a guide roller for use in a wastewater treatment facility in lieu of bearings which require greasing.

SUMMARY OF THE INVENTION

There is provided a guide roller assembly for use in a cog rake bar screen of a wastewater treatment facility comprising a pin and a guide roller, wherein the guide roller directly surrounds the pin and freely rotates about the pin. There is also provided a guide roller assembly for use in a cog rake bar screen comprising a pin and a guide roller, the guide roller surrounding the pin, wherein the guide roller is comprised of a low-friction polymeric material and the guide roller may rotate about the fixed mounting pin, or the shaft driven fixed mounting pin rotates within the guide roller.

BRIEF DESCRIPTION OF THE DRAWINGS

FIG. 2A is an end view of a first embodiment of a guide roller.

FIG. 2B is a side view of the guide roller.

FIG. 3A is an end view of a guide roller mounting pin.

FIG. 3B is a side view of the guide roller mounting pin.

FIG. 5 is a side elevational view, with portions broken away, of a typical cog rake bar screen wherein the guide roller assembly of the present invention may be utilized.

DESCRIPTION OF THE PREFERRED EMBODIMENTS

Figure 1:
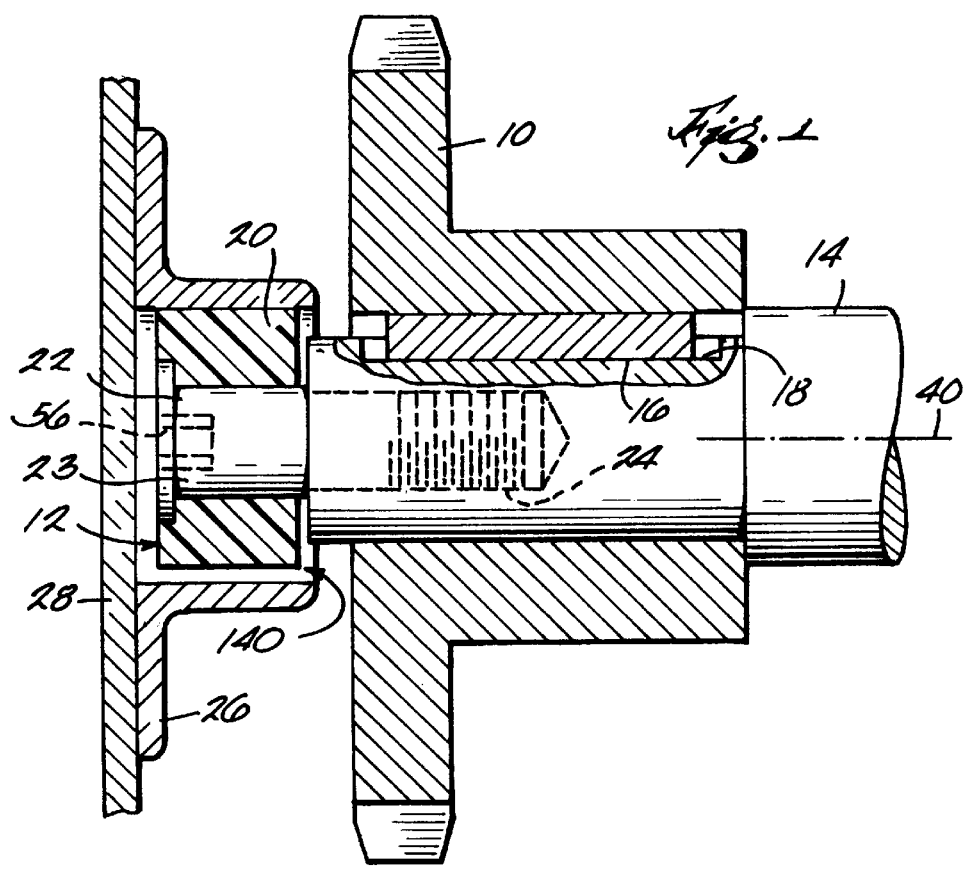
FIG. 1 is a cross sectional top view of a guide roller assembly of the present invention.

Referring now to FIG. 1, there is shown a cog wheel 10 and a guide roller assembly 12 used in connection with a cog rake bar screen in a wastewater treatment facility. A cog rake bar screen wherein the guide roller assembly of the present invention may be used is shown and described with reference to FIG. 5 hereinafter. A similar view of that shown in FIG. 1 would be disposed at the opposing side of the cog rake bar screen. Referring to FIGS. 1 and 5, two cog wheels 10 are keyseated and set screwed to a drive shaft 14 and create the movement of the cog rake operating carriage 104, supporting a cog rake 134, up and down a pin rack 116 as is standardly done in the industry. The cog wheel 10 is fixed to the shaft 14 for rotation with the shaft 14 by a key 16, fitted into a cut keyslot 18 into the shaft 14.

Guide roller assemblies 12 support the opposite ends of the shaft 14 for smooth generally vertical movement in guide tracks 26 of a frame 28. The guide roller assemblies 12 each include a guide roller 20 and a guide roller mounting pin 22. The guide roller mounting pin 22 may, for example, be secured to the drive shaft 14 by the use of threads 24. The threads may incorporate Loctite general purpose blue which is a locking compound to help insure that the threads do not become loose. The guide roller assembly 12 may be guided along a guide track 26 formed by a pair of spaced apart angles, in turn supported by a side frame 28. A gap 140 is shown between the guide roller 20 and guide track 26 so that the guide roller 20 may slide or roll along the guide track 26 as will be further explained hereinbelow. Typically, gap 140 (greatly exaggerated in FIG. 1 for description purposes only) provides a very small clearance of about 0.031 inches between the guide roller 20 and the guide track 26.

Referring also to FIGS. 2A and 2B, there is shown a first embodiment of the guide roller 20. The guide roller 20 may comprise a sleeve or liner 21 of material which surrounds the guide roller mounting pin 22. The guide roller 20 is formed of nonmetallic low-friction polymeric material, preferably, of a cast nylon product filled with molybdenum and oil. More preferably, guide roller 20 is molded or machined of Nylatron GSM Blue moly-filled nylon as supplied in raw material by Polymer Corporation of Reading, Pennsylvania. Still, more preferably, guide roller 20 is molded or machined of Acetron, an acetal base polymer, as supplied in raw material by Polymer Corporation of Reading, Pennsylvania.

The guide roller 20 may, for example, have a width 30 of 1.9375 inches, an outer diameter 32 of 3.502 inches, an inner diameter 34 of 1.379 inches, a diameter 36 of 2.125 inches, and a recess dimension 38 of 0.25 inches. The dimensions 36 and 38 represent the dimensions of the guide roller 20 around the pin flange to be described and define a recess 39 in the guide roller 20. Preferably, the guide roller 20 is symmetric about axis or line 40 and the sides of the guide roller 20 form an angle 42 of ninety degrees with line 40. Further, preferably edges 44 of the guide roller 20 are rounded and have a radius of curvature of 0.0625 inches to insure no sharp edges are present.

Referring now to FIGS. 3A and 3B, there is shown the guide roller mounting pin 22. The guide roller mounting pin 22 has an end 23 adapted to be housed in a counterbore (FIG. 2B) of the guide roller 20 to allow for movement along the guide track 26 of the cog rake bar screen frame 28 as is more fully explained hereinbelow. The guide roller mounting pin 22 may comprise a pin flange 50, a first pin section 52, and a second pin section 54. The guide roller 20 may be disposed around the pin flange 50 and the first pin section 52. The threading 24 on the guide roller mounting pin 22 may be disposed upon a portion of the second pin section 54. Further, preferably a hex 56 is disposed at the end of the guide roller mounting pin 22 and extends into both the pin flange 50 as well as into a portion of the first pin section 52 as shown. The hex may, for example, be a 0.625 inch hex having a 0.75 inch depth.

The guide roller mounting pin 22 may, for example, have a length 58 of 4.75 inches, a pin flange length 60 of 0.21875 inches, a pin flange diameter 62 of 2.0 inches, a first pin section diameter 64 of 1.375 inches, a second pin section diameter 66 of 1.250 inches. The thread length 68 may, for example, be at least 1.75 inches. Further, the threading 24 may have a National Fine Thread of 1.25 inches in diameter. Moreover, the length 70 from one side of the pin 22 to the end of the first pin section may be 1.969 inches. The underside of the pin head 50 may have a surface finish of 125 microns to prevent galling of the nonmetallic roller 20.

The guide roller 20 may be slidingly inserted around the guide roller mounting pin 22 prior to securing the guide roller mounting pin 22 to the drive shaft 14. The guide roller mounting pin 22 may be secured to the drive shaft by threading 24. The guide roller 20 may freely rotate about the guide roller mounting pin 22 and specifically, the end 23 or the pin flange 50 and first pin section 52 while guiding the guide roller assembly 12 along the guide track 26. The guide roller 20 may also slide or roll along the guide track or channel 26 as the shaft driven fixed pin 22 rotates within the guide roller 20. The guide roller 20 remains at a given location along axis 40 because at one side, the pin flange 50 via its cooperation with the counterbore recess 39 in the guide roller 20 prevents sideways motion of the guide roller 20. Further, at the opposing side, the drive shaft 14 prevents sideways motion of the guide roller 20 as best seen in FIG. 1. As a result, the guide roller 20 preferably just rotates about axis 40. However, preferably, the guide roller 20 is not pinched in between the pin flange 50 and the drive shaft 14. Further, preferably, the pin 22 has a shoulder 65 to prevent too much of the pin 22 from being inserted into the shaft 14.

Figure 4:
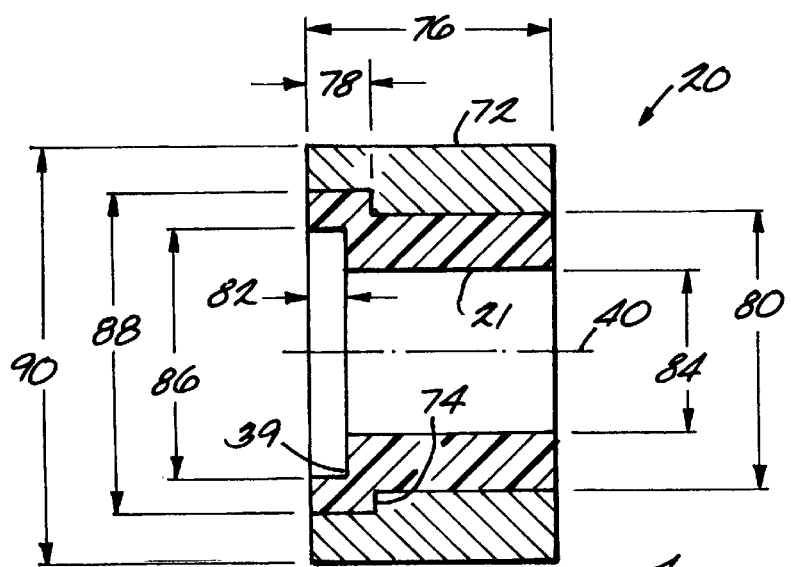
FIG. 4 is a cross sectional view of an alternate embodiment for the guide roller.

Referring now to FIG. 4, there is shown an alternate embodiment of the guide roller 20 which may be used for higher loading applications. Similar components have been labeled similarly for purposes of clarity. The guide roller 20 is similar to that shown in FIG. 2 except for the fact that there is an additional sleeve of metal surrounding a liner of Nylatron GSM Blue moly-filled nylon and the sleeve of Nylatron is dimensioned such that it has an additional hub for mating to a companion shoulder in the surrounding metal sleeve.

Specifically, guide roller 20 comprises a liner 21 of nonmetallic low-friction polymeric material, preferably, made of any of the materials previously mentioned with respect to guide roller 20 described hereinabove and as shown in FIGS. 1–3. As with the first embodiment, the liner 21 surrounds the guide roller mounting pin 22. Further, the guide roller 20 comprises an exterior sleeve 72 of metal. Preferably exterior sleeve 72 is formed of stainless steel to improve the loading capability of the guide roller assembly 12. Further, both the nonmetallic liner 21 and the metallic or exterior sleeve 72 are preferably formed such that a shoulder 74 results in the liner 21 and sleeve 72. Shoulder 74 helps prevent any sideways movement of the exterior sleeve 72. The liner 21 and the sleeve 72 may, for example, be secured together by press fitting the liner and sleeve together. That is, the liner 21 may be slightly oversized for the bore of the sleeve 72 and thus the liner and sleeve may be machine forced together. As stated above, the guide roller 20 freely rotates about the guide roller mounting pin 22.

The guide roller liner 21 may have a dimension 76 of 1.9375 inches, a dimension 78 of 0.5 inches, a dimension 80 of 2.38 inches, a dimension 82 of 0.25 inches, a dimension 84 of 1.379 inches, a dimension 86 of 2.125 inches, a dimension 88 of 2.756 inches, and an outer diameter 90 of 3.502 inches.

The use of the low-friction polymeric liner 21 which surrounds the pin 22 allows the guide roller assembly 12 to freely rotate without the use of any grease. As a result, the guide roller assembly 12 may be submerged into wastewater without resulting in bearing failures due to a lack of grease provided to the bearings as in conventional designs.

A typical cog rake bar screen 100 found in a wastewater treatment facility is shown in FIG. 5. For a more complete description of the cog rake bar screen shown in FIG. 5, see U.S. Pat. No. 5,246,573, which is hereby incorporated by reference.

The cog rake bar screen 100 is shown with an inverted U-shaped frame 102, including side frame members 28 mounted over a water-carrying channel and adjacent to an upstream side of a bar screen 108. An upstream guide track or channel 26 and a downstream guide track or channel 26 are secured to each side frame member 28. Cog wheels 10 are secured to each end of a drive shaft 14. The cog wheels 10 are a part of a rake and drive assembly 104 more fully described, for example, in U.S. Pat. No. 5,246,573. The rake and drive assembly 104 includes a rake arm 134. Rotation of the drive assembly and in turn the drive shaft mounted cog wheels 10 will cause the entire rake and drive assembly 104 to ascend or descend in the guide tracks 26 of the cog rake bar screen 100. As the rake and drive assembly 104 moves along the guide track or channel 26, the rake arm 134 clears debris from the cog rake bar screen 100, as further described in U.S. Pat. No. 5,246,573, in a manner generally known to those skilled in the art.

Cog rake bar screens are commonly used in wastewater treatment plants to remove debris as it collects on the upstream side of bar screens or racks secured in and spanning the channel carrying wastewater, such wastewater identified as 106 in FIG. 5. The level of the water in the channel may occasionally, such as from flooding due to heavy rainfall or mechanical problems associated with the cog rake bar screen or wastewater treatment facility, be so high that the entire rake and drive assembly 104, or various parts thereof, will become submerged in the wastewater 106 during operation. Additionally, it should be noted that many applications require that the entire cog rake mechanism 100, or components thereof, be intentionally submerged into the wastewater being treated.

As noted above, prior cog rake bar screens utilize standard mechanical bearings to support the opposite ends of the shaft 14 and to ensure smooth movement of rake and drive assemblies. As previously observed, when a bearing is submerged into the wastewater being treated, the flow of the water or sewage may flush the grease used to lubricate the bearings from the bearings and may ultimately lead to the corrosion of the internal roller or ball bearings internal to the load runner bearings. This, of course, may result in the bearings locking up or otherwise failing to perform properly. The guide roller assembly of the present invention is envisioned to be used in a cog rake bar screen of a wastewater treatment facility in lieu of bearings. The guide roller assembly according to the present invention supports the respective opposite ends of the shaft 14 and the guide roller follower 150 shaft and does not require any lubrication. Therefore, the guide roller assembly of the present invention may be submerged in or cycle in and out of wastewater without detrimentally affecting the operation or function of the guide roller assembly.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claim is:

1. A guide roller assembly for use in a cog rake bar screen of a wastewater treatment facility, said guide roller assembly comprising:

a guide roller mounting pin having an end adapted to be housed in a channel of the cog rake bar screen for movement along the channel; and a guide roller supported on the end of said pin for rotation about an axis, said roller being adapted to rotate around said pin and to support the guide roller mounting pin for movement along the channel, and said roller further including a low-friction polymeric material engaging the guide roller mounting pin and providing a low friction material contact with the guide roller mounting pin.

2. A guide roller assembly for use in a cog rake bar screen of a wastewater treatment facility said guide roller assembly comprising:

a guide roller mounting pin having an end adapted to be housed in a channel of the cog rake bar screen for movement along the channel; and a guide roller supported on the end of said pin for rotation about an axis, said roller being adapted to slide or roll along the channel, said guide roller being comprised of molybdenum and oil filled cast nylon.

3. A guide roller assembly for use in a cog rake bar screen of a wastewater treatment facility, said guide roller assembly comprising:

a guide roller mounting pin having an end adapted to be housed in a channel of the cog rake bar screen for movement along the channel; and a guide roller supported on the end of said pin for rotation about an axis, said roller being adapted to slide or roll along the channel, said guide roller being comprised of an acetal based polymer.

4. A guide roller assembly for use in a cog rake bar screen of a wastewater treatment facility, said guide roller assembly comprising:

a guide roller mounting pin having an end adapted to be housed in a channel of the cog rake bar screen for movement along the channel; and a guide roller supported on the end of said pin for rotation about an axis, said roller being adapted to slide or roll along the channel, and said roller further including a low-friction polymeric material, said guide roller further including a liner having an outside diameter and an inside diameter, and wherein the liner further includes a third diameter and a recess dimension, wherein the third diameter of the liner and the recess dimension define a recess in said guide roller; and wherein said guide roller mounting pin further comprises a pin flange, a first pin section and a second pin section, wherein said guide roller surrounds the pin flange and first pin section of said guide roller mounting pin such that the pin flange of said guide roller mounting pin is positioned within the recess of said guide roller, wherein said guide roller rotates about said guide roller mounting pin, and said guide roller assembly moves within a guide track of a frame of the cog rake bar screen.

5. The guide roller assembly of claim 4, wherein said guide roller further includes an external sleeve, the external sleeve being disposed around the liner.

6. The guide roller assembly of claim 5, wherein the liner is of a nonmetallic material and the external sleeve is of a metallic material.

7. The guide roller assembly of claim 6, wherein said metallic external sleeve material is stainless steel.

8. The guide roller assembly of claim 7, wherein said nonmetallic liner material is comprised of molybdenum and oil filled cast nylon.

9. The guide roller assembly of claim 7, wherein said nonmetallic liner material is an acetal based polymer.

10. A cog rake bar screen for use in a wastewater treatment facility, said cog rake bar screen comprising:

a frame, said frame including a vertical channel;

a rake;

a guide roller assembly, said guide roller assembly connected to said rake for guiding said rake during movement;

said guide roller assembly including a guide roller mounting pin having an end adapted to be housed in the vertical channel of the cog rake bar screen for movement within the vertical channel; and said guide roller assembly further including a guide roller supported on the end of said pin for rotation about an axis, said roller being adapted to slide or roll within the channel, said guide roller being comprised of molybdenum and oil filled cast nylon.

11. A cog rake bar screen for use in a wastewater treatment facility, said cog rake bar screen comprising:

a frame, said frame including a vertical channel;

a rake;

a guide roller assembly, said guide roller assembly connected to said rake for guiding said rake during movement;

said guide roller assembly including a guide roller mounting pin having an end adapted to be housed in the vertical channel of the cog rake bar screen for movement within the vertical channel; and said guide roller assembly further including a guide roller supported on the end of said pin for rotation about an axis, said roller being adapted to slide or roll within the channel, said guide roller being comprised of an acetal based polymer.

12. A cog rake bar screen for use in a wastewater treatment facility, said cog rake bar screen comprising:

a frame, said frame including a vertical channel;

a rake;

a guide roller assembly, said guide roller assembly connected to said rake for guiding said rake during movement;

said guide roller assembly including a guide roller mounting pin having an end adapted to be housed in the channel of the cog rake bar screen for movement within the channel; and said guide roller assembly further including a guide roller supported on the end of said pin for rotation about an axis, said roller being adapted to slide or roll within the channel, said guide roller further including a low-friction polymeric material, said guide roller further including a liner having an outside diameter and an inside diameter, and wherein the liner further includes a third diameter and a recess dimension, wherein the third diameter of the liner and the recess dimension define a recess in said guide roller; and wherein said guide roller mounting pin further comprises a pin flange, a first pin section and a second pin section, wherein said guide roller surrounds the pin flange and first pin section of said guide roller mounting pin such that the pin flange of said guide roller mounting pin is positioned within the recess of said guide roller, wherein said guide roller rotates about said guide roller mounting pin, and said guide roller assembly moves within a guide track of a frame of the cog rake bar screen.

13. The guide roller assembly of claim 12, wherein said guide roller further includes an external sleeve, the external sleeve being disposed around the liner.

14. The guide roller assembly of claim 13, wherein the liner is of a nonmetallic material and the external sleeve is of a metallic material.

15. The guide roller assembly of claim 14, wherein said metallic external sleeve material is stainless steel.

16. The guide roller assembly of claim 15, wherein said nonmetallic liner material is comprised of molybdenum and oil filled cast nylon.

17. The guide roller assembly of claim 15, wherein said nonmetallic liner material is an acetal base compound.

* * * * *